United States Patent
Foo et al.

(10) Patent No.: US 6,439,007 B1
(45) Date of Patent: Aug. 27, 2002

(54) ENHANCED OCCUPANT SPRING MASS MODEL FOR USE WITH AN ACTUATABLE RESTRAINT SYSTEM INCLUDING COMPENSATING FOR MONOTONICITY OF MISUSE CONDITIONS

(75) Inventors: Chek-Peng Foo, Ann Arbor; Paul Leo Sumner, Farmington Hills; Timothy Chester Wright, Ann Arbor; Kevin Daniel Weiss, Farmington Hills, all of MI (US); Gustavo Andres Delfino, Miranda (VE)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/723,390

(22) Filed: Nov. 28, 2000

(51) Int. Cl.[7] .......................... B60R 22/00; G05D 3/00; G06F 7/10; G06F 17/00; G06F 19/00
(52) U.S. Cl. .......................... 70/45; 180/268; 180/274; 180/273; 180/282; 280/735; 280/732; 280/806; 280/728.1; 200/61.53
(58) Field of Search ............................ 701/45; 180/268, 180/274, 273, 282, 271; 280/735, 732, 806, 728.1; 242/379.1, 374, 376, 375.3; 297/483, 480; 177/144, 208; 200/61.53, 61.45 R; 442/203

(56) References Cited

U.S. PATENT DOCUMENTS

| | | | |
|---|---|---|---|
| 5,398,185 A | 3/1995 | Omura | 701/45 |
| 5,673,932 A | 10/1997 | Nitschke et al. | 280/735 |
| 5,702,124 A | 12/1997 | Foo et al. | 280/735 |
| 5,787,377 A | 7/1998 | Watanabe et al. | 701/45 |
| 5,900,529 A * | 5/1999 | Haniski et al. | 73/1.38 |
| 5,935,182 A * | 8/1999 | Foo et al. | 701/45 |
| 6,168,198 B1 * | 1/2001 | Breed et al. | 280/735 |
| 6,186,539 B1 * | 2/2001 | Foo et al. | 280/735 |
| 6,270,116 B1 * | 8/2001 | Breed et al. | 280/735 |

\* cited by examiner

Primary Examiner—Yonel Beaulieu
Assistant Examiner—Ronnie Mancho
(74) Attorney, Agent, or Firm—Tarolli, Sundheim, Covell, Tummino & Szabo L.L.P.

(57) ABSTRACT

An apparatus for switching the value of a spring constant K used in a spring mass model (54, 56, 60, 70, 76) for modeling a vehicle occupant in an occupant restraint system (20) includes a sensor (22) for sensing a crash event and providing a crash signal (40) indicative thereof. The spring mass model adjusts the acceleration signal and determines a virtual velocity value (72) and a virtual displacement value (78). The spring value K of the spring mass model is controlled in response to the determined virtual velocity value and the determined virtual displacement value relative to associated switching quadrants defined by predetermined velocity and displacement thresholds.

20 Claims, 12 Drawing Sheets

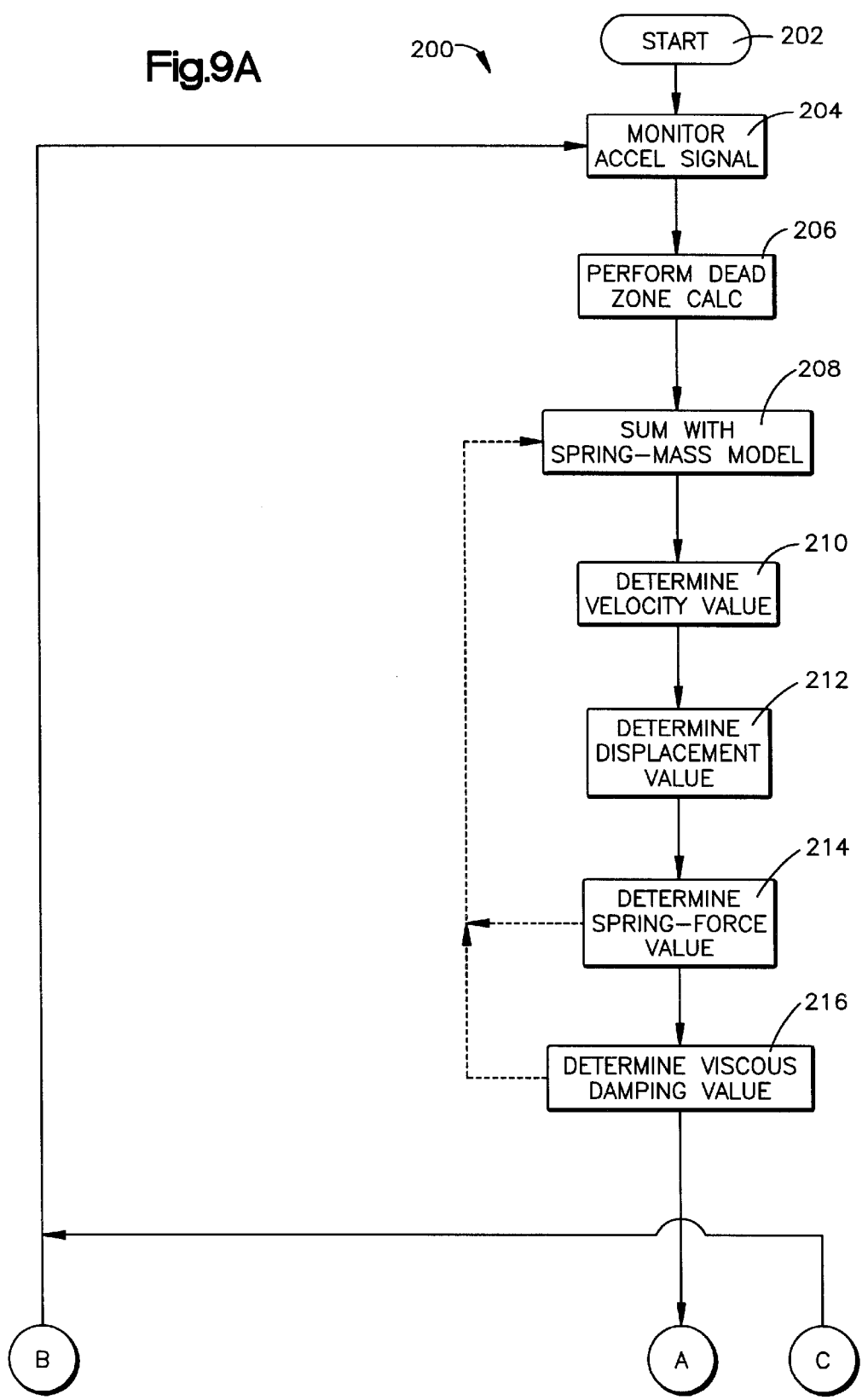

ENHANCED OCCUPANT SPRING MASS MODEL FOR USE WITH AN ACTUATABLE RESTRAINT SYSTEM INCLUDING COMPENSATING FOR MONOTONICITY OF MISUSE CONDITIONS

TECHNICAL FIELD

The present invention is directed to a method and apparatus for modeling characteristics of a vehicle occupant during a vehicle crash event and using that model in the control of an actuatable restraint including compensating for monotonicity of misuse conditions.

BACKGROUND OF THE INVENTION

Crash sensing algorithms for use in actuatable occupant restraint systems to discriminate between deployment and non-deployment crash events are known in is the art. These algorithms are adapted to discriminate between particular types of crash events for particular vehicle platforms. Such algorithms not only control whether the restraint is actuated, but the timing of the actuation.

One known type of actuatable occupant restraint system includes an air bag. An air bag restraint system includes an electrically actuatable igniter, referred to as a squib. Such systems further include a crash sensing device for monitoring for a vehicle crash event. When a deployment crash event is determined to be occurring from the monitored crash event using an appropriate crash algorithm, an electric current of sufficient magnitude and duration is passed through the squib to ignite the squib. The squib, when ignited, ignites a combustible gas generating composition and/or pierces a container of pressurized gas, which results in inflation of the air bag.

Many known crash sensing devices include an electrical transducer or accelerometer for sensing a vehicle crash event. The accelerometer provides an electrical signal having an electrical characteristic indicative of the vehicle's crash acceleration. An evaluation circuit, such as a microcomputer, is connected to the output of the accelerometer. The microcomputer determines one or more crash metrics from the crash acceleration signal such as crash acceleration, crash energy, crash velocity, crash displacement, and/or crash jerk. Crash metrics provide crash metric values which are measures of crash intensity. The microcomputer then performs a crash algorithm using the determined crash metrics to discriminate between a deployment and non-deployment crash event. When a deployment crash event is determined to be occurring, the restraint is actuated, e.g., the air bag is deployed.

One difficulty in discriminating between Ddeployment and non-deployment crash events is, of course, the proper evaluation of no-fire (non-deployment) crash events that have a relatively low crash severty, e.g., a 6 MPH (10 KPH), zero degree barrier crash. Another difficulty encountered in crash discrimination is the processing of signals resulting from, what is referred to herein as, vehicle "misuse events." These misuse events include the vehicle being subject to rough road conditions, potholes, curb strikes, etc. Such misuse events result in the crash sensor, e.g., accelerometer, outputting signals to the microcomputer. The microcomputer processes these signals resulting from the misuse events which could result in crash metric values. It has been found that misuse events have monotonicity in certain crash metrics in that an increase in the severity of the misuse event results in determined higher crash metric values. It is desirable to (i) not only prevent deployment of the restraint as a result of a misuse event, but (ii) quickly reset the metric values back to a zero state at the end of the misuse event.

SUMMARY OF THE INVENTION

The present invention is directed to a method and apparatus for modeling a vehicle occupant including hastening the resetting of crash metrics to compensate for monotonicity of misuse events.

In accordance with the present invention, a spring mass model is provided for use in an actuatable occupant restraint system. The model comprises a switchable spring constant having a value responsive to a determined virtual crash velocity value.

In accordance with another aspect of the present invention, an actuatable occupant restraint system is provided comprising a crash sensor mountable to a vehicle and providing a crash signal in response to a vehicle crash event, crash velocity determining means for determining a crash velocity value from a crash signal, and crash determining means for determining the occurrence of a vehicle crash event in response to the determined crash velocity value. The crash determining means includes a spring mass model for use in the crash determination. The spring mass model includes a switchable spring constant switchable to a value responsive to the determined virtual crash velocity value. In accordance with another embodiment, the apparatus further includes crash displacement determining means responsive to the crash signal for determining a virtual crash displacement value. The switchable spring constant is further responsive to the determined crash displacement value.

In accordance with another aspect of the present invention, an actuatable restraint system comprises an accelerometer mounted to the vehicle for providing an electric signal indicative of crash acceleration. A spring mass model is coupled to the crash acceleration signal for providing a modified crash acceleration signal indicative of the virtual acceleration of a vehicle occupant. Crash velocity determining means determines a virtual crash velocity value from the virtual crash acceleration signal. Crash displacement determining means for determining a virtual crash displacement value from the virtual crash acceleration signal. Crash determining means monitors the virtual crash velocity value and the virtual crash displacement value and determines the occurrence of a crash event in response thereto. A predetermined crash velocity value and a predetermined crash displacement value define a first quadrant switch boundary. First determining means determines when the value of virtual crash velocity value and the virtual crash displacement value is within said first quadrant switch boundary. A predetermined crash velocity value and a predetermined crash displacement value define second quadrant switch boundary. Second determining means determines when the value of the virtual crash velocity value and the virtual crash displacement value is within said second quadrant switch boundary. Means are provided for controlling the spring value in response to the value of the virtual crash velocity value and the virtual crash displacement value being within the first and second quadrant switch boundaries.

In accordance with another aspect of the present invention, a method is provided for using a spring mass model in an actuatable occupant restraint system. The method comprises the steps of switching a spring constant value in response to a determined occupant crash velocity value.

In accordance with another aspect of the present invention, a method is provided for controlling an actuatable occupant restraint system comprising the steps of mounting a crash sensor to a vehicle and providing a crash signal in response to a vehicle crash event, determining a crash velocity value from the crash signal, and determining the occurrence of a vehicle crash event in response to the determined crash velocity value. The step of determining the occurrence of a vehicle crash event includes using a spring mass model and selecting a spring constant value responsive to the determined crash velocity value. In accordance with another aspect, the method further includes the steps of determining a crash displacement value, and wherein the step of selecting a spring constant value is further responsive to the determined crash displacement value.

BRIEF DESCRIPTION OF THE DRAWINGS

The present invention will be appreciated by one skilled in the art to which the present invention relates upon consideration of the following detailed description of the invention with reference to the accompanying drawing, wherein:

FIGS. 9A and 9B depict, in flow chart form, a control process for an actuatable restraint system for use with the present invention;

DESCRIPTION OF PREFERRED EMBODIMENTS

Figure 1:
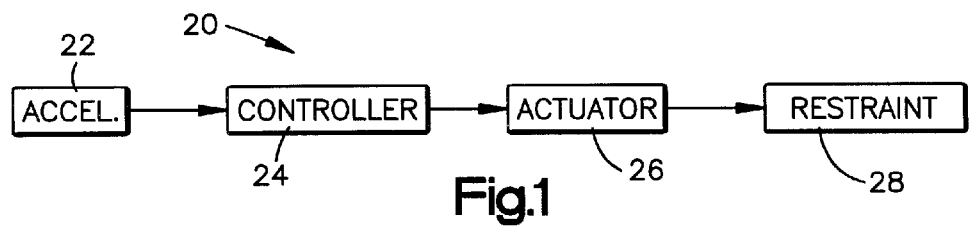
FIG. 1 is ahscematic block diagram of an actuatable restraint system in accordance with the present invention.

Referring to FIG. 1, an occupant restraint system 20 includes an accelerometer 22 operatively mounted to the vehicle at an appropriate crash sensing location, such as the vehicle's transmission tunnel. The accelerometer 22 outputs an electrical signal having a characteristic, such as amplitude and frequency, indicative of the vehicle's crash acceleration. The output of the accelerometer 22 is connected to a controller 24, such as a microcomputer, for processing and evaluation of the accelerometer output signal.

The acceleration signal is filtered to remove certain signal characteristics, such as certain frequency components, that are empirically determined to not be useful in discriminating between different types of vehicle crash conditions. Filtering of the acceleration signal could occur (i) in an accelerometer assembly containing the accelerometer 22 using discrete circuit components, and/or (ii) within the controller 24 using digital filtering techniques. The filtering of the acceleration signal reduces signal noise and non-useful information that may be present on the accelerometer signal. It has been empirically determined that acceleration signal frequencies below 300 Hz contain useful information for crash discrimination.

The controller 24 monitors the acceleration signal, determines crash metrics, and uses determined crash metric values in a crash algorithm to determine if a deployment crash condition is occurring, i.e., one for which an actuatable restraint 28, such as an air bag, should be deployed. In accordance with one exemplary embodiment of the present invention, a velocity/displacement-based algorithm is used for crash discrimination purposes. This algorithm utilizes an occupant spring mass model in its determination of whether a deployment or non-deployment crash condition is occurring. The crash algorithm sums the crash acceleration signal with an occupant spring-mass model so as to provide an adjusted or "virtual" crash acceleration signal more nearly representative of the actual acceleration of the vehicle occupant during a crash event. Such a control algorithm is disclosed in U.S. Pat. No. 5,935,182 to Foo et al.

In particular, this virtual sensing algorithm uses the occupant spring-mass model, which is functionally related to both a determined virtual occupant velocity and a determined virtual occupant displacement, to adjust the value of the monitored crash acceleration signal. The adjusted crash acceleration value is used to determine adjusted crash metric values subsequently used to determine whether a deployment crash event is occurring in accordance with the crash algorithm.

During vehicle use, a vehicle is subject to misuse events. Misuse events include rough roads, potholes, curb strikes, etc., all of which can result in an output signal from the accelerometer. The signals resulting from the misuse events can result in determined crash metric values. Misuse events are distinguishable from no fire events such as relatively low severity crash events, e.g., a 6 MPH (10 KPH) into a barrier. There is a monotonicity of determined crash metric values resulting from vehicle misuse events.

For example, the greater the intensity of a misuse event, the greater the magnitude of the virtual velocity/ displacement values. As described herein, the present invention hastens the reset time of the crash metric values toward a zero state when the signals result from misuse conditions.

If the crash algorithm determines that a deployment crash condition has occurred, the controller 24 outputs a control signal to an actuator 26, such as a squib. The actuator 26 is operatively coupled to the actuatable occupant restraint 28, e.g., an air bag. Specifically, the squib is operatively connected to a source of gas generating material and/or bottle of pressurized gas associated with the air bag. Passing a predetermined electrical current through the squib for a predetermined time period ignites the squib. The squib ignites the gas generating material and/or pierces the pressurized gas bottle, thereby, actuating the restraint 28, e.g., inflating the air bag.

Figure 2:
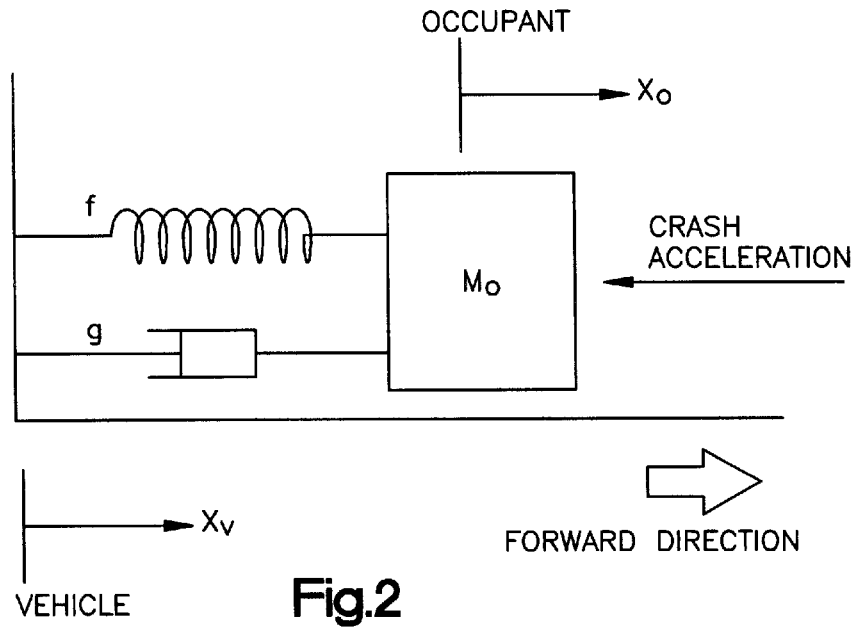
FIG. 2 is a schematic representation of an occupant spring-mass model used with the present invention.

Referring to FIG. 2, an occupant spring-mass model includes an occupant represented by a mass $M_o$. When the vehicle is subjected to a crash condition, the resulting crash acceleration a(t) experienced by the vehicle is considered to be the driving function that gives an initial pulse to the occupant spring-mass model. A spring force f(X), in the model, is a force on the occupant that results from the seat belt system. A damping force g(V) in the occupant spring-mass model is the frictional effect on the occupant which results from the seat belt system, e.g., friction resulting from the seat belt stretching due to occupant loading during a vehicle crash condition. The term $X_o$ (subscript "o" for "occupant") is used to represent the position of the occupant relative to an initial pre-crash location at the on-set of the vehicle crash condition. The term $X_v$ (subscript "v" for "vehicle") is used to represent the position of the vehicle relative to the initial pre-crash location from the on-set of the vehicle crash condition. The equation of motion of the vehicle occupant can be expressed as:

$$M_o \ddot{X}_o + f(X_o - X_v) + g(\dot{X}_o - \dot{X}_v) = 0$$

since the sum of the forces must equal 0. By defining X to be:

$$X = X_o - X_v$$

and noting that:

$$-\ddot{X}_v = a(t)$$

one gets:

$$\ddot{X} = \frac{-f(X)}{M_o} + \frac{-g(\dot{X})}{M_o} + a(t)$$

where:

$$X(0) = \dot{X}(0) = 0$$

Since the "occupant" for the spring-mass model is an "ideal" occupant, a crash dummy, referred to herein in equations as "dummy" simulates such occupant. The relative velocity of the occupant is designated "vel_dummy_rel" and the relative displacement of the occupant is designated "displ_dummy_rel" so that:

$$\dot{X}(t) = \text{vel\_dummy\_rel}$$

and $$X(t) = \text{displ\_dummy\_rel}$$

The normalized spring force "$f/M_o$" can be represented by:

$$\frac{f}{M_o} = \frac{K}{M_o} \cdot X$$

The normalized damping force "$g/M_o$" can be represented by:

$$\frac{g}{M_o} = B \cdot \frac{\dot{X}}{M_o}$$

The spring force for the spring portion of the spring-mass model of the present invention is a function of displacement d and can be expressed as:

$$f(d) = K \cdot d$$

Figure 3:
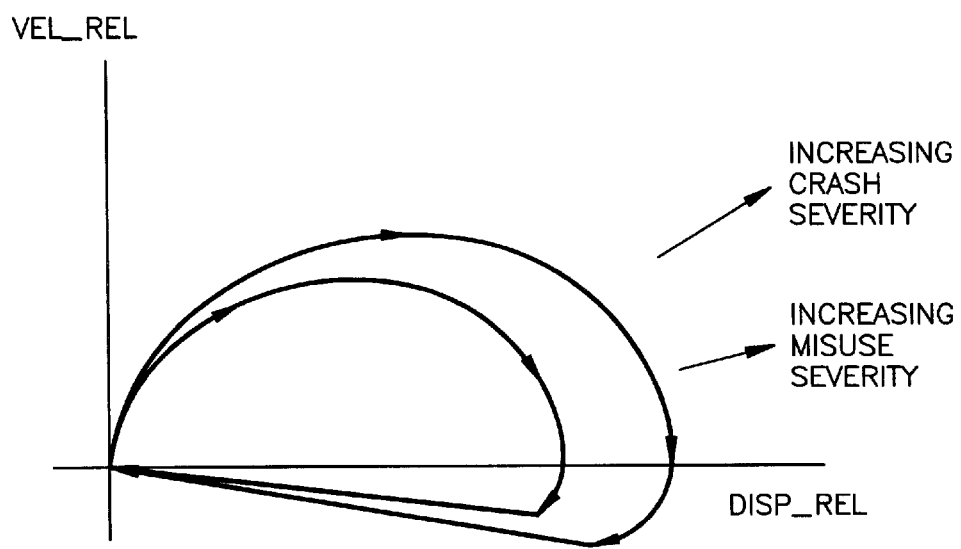
FIG. 3 shows two plots of determined virtual occupant velocity verses determined virtual occupant displacement during a crash event.

Referring to FIG. 3, a plot of the vel_dummy_rel as a function of displ_dummy_rel (e.g., virtual occupant relative velocity versus virtual occupant relative displacement) is shown which would occur during a frontal vehicle crash condition in accordance with the occupant spring-mass model of the present invention. A plot of velocity versus displacement values resulting from vehicle misuse conditions results in a similar shape or curve. Initially, velocity increases and displacement increases. When the velocity returns to zero, displacement is at its maximum value. At that point, the occupant begins a return to his initial pre-event position. As shown, both the determined occupant virtual velocity and the determined occupant virtual displacement increase away from the origin (the pre-event location) as the severity of the event increases, from either an actual crash event or from a misuse condition.

As mentioned, when the velocity value reaches zero, the displacement value reaches a maximum value. This is the maximum displacement value the occupant reaches from the initial pre-crash location. When the determined virtual velocity value becomes negative, the occupant's determined displacement value begins to decrease back toward the initial pre-crash location. If the velocity/displacement metric values are a result of a misuse condition, it is desirable to quickly return the velocity/displacement values to zero.

In accordance with the present invention, the spring value K is switched to a greater value in response to certain criteria to quicken the return of the determined velocity/displacement values back to the origin. This enhances the occupant spring mass model by compensating for the monotonicity of the misuse events. A similar result is desirable for rearward crash events for the control of rearward crash restraints such as an active head restraint, i.e., to return metric values back to the origin when values result from misuse events.

Figure 4A:
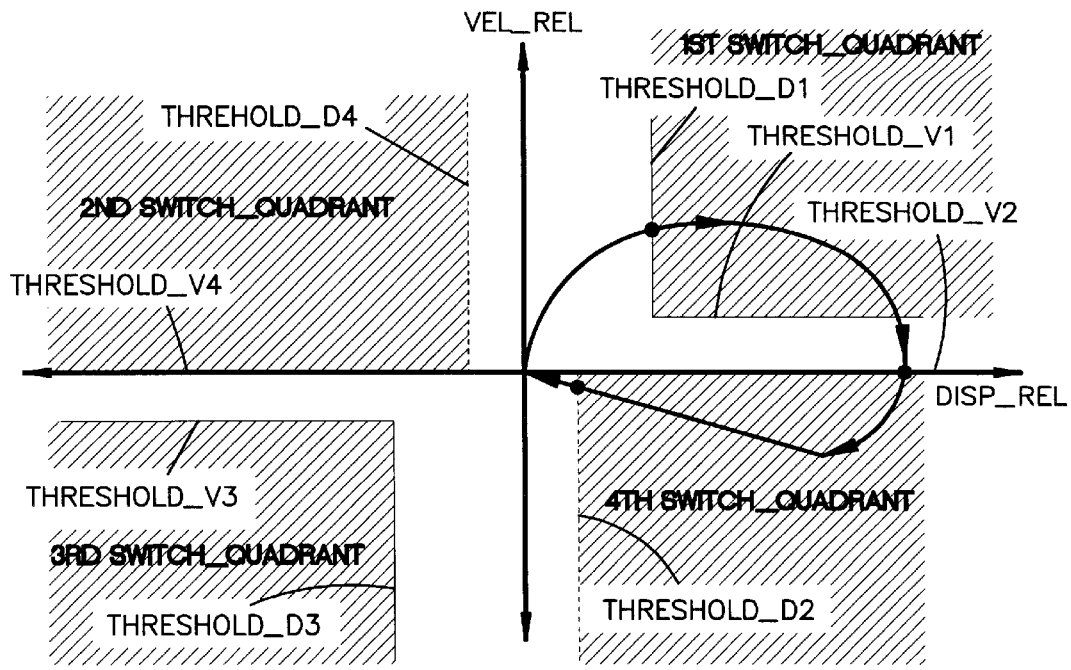
FIG. 4A shows a plot of determined virtual occupant velocity verses determined virtual occupant displacement for a frontal impact crash event with quadrant switch control boxes in accordance with the present invention.

With reference to FIG. 4A, a plot of the virtual occupant velocity versus the virtual occupant displacement is shown that results from misuse events yielding frontal values, i.e., positive displacement and velocity values. This plot includes velocity/displacement switch boxes used to enhance the occupant spring mass model by compensating for the monotonicity of the crash metrics while hastening the reset times of the crash metric values resulting from the misuse event. The graph shows frontal effects of a misuse event that should be appreciated because the virtual occupant velocity is positive and displacement is positive, i.e., toward the dashboard. A positive displacement is analogous to forward movement of the virtual occupant.

Figure 4B:
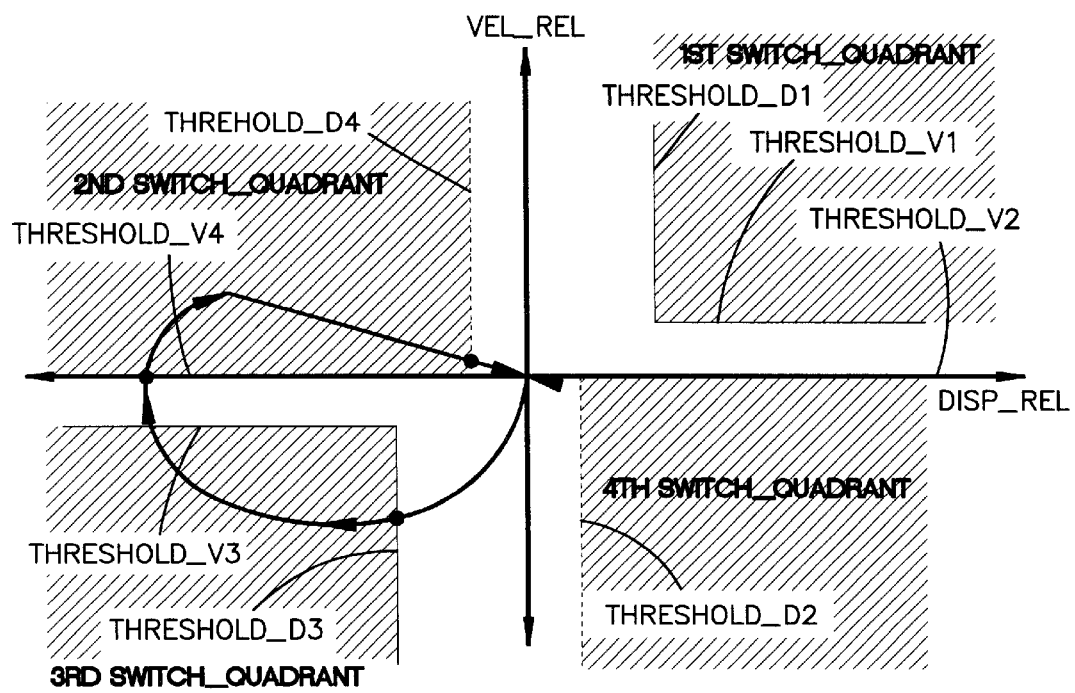
FIG. 4B shows a plot of determined virtual occupant velocity verses determined virtual occupant displacement for a rear impact crash event with quadrant switch control boxes in accordance with the present invention.

FIG. 4B illustrates a plot of the virtual occupant velocity versus the virtual occupant displacement for a misuse event yielding rearward values, i.e., negative velocity and negative displacement values. This plot shows velocity/displacement switch boxes used to enhance the spring mass model by compensating for the monotonicity of the crash metric values during a misuse event and permitting quicker reset times of the metric values. The graph shows the rearward effects yielding rearward values, i.e., negative velocity and displacement values. It should be appreciated that the virtual occupant displacement is negative, i.e., away from the dashboard. A negative displacement is analogous to rearward movement of the virtual occupant.

In accordance with the present invention, for misuse events resulting in positive velocity and displacement determinations, K assumes one value (e.g., K=1) when the determined virtual velocity value and determined virtual displacement values are both positive and assumes a second value (e.g., K=3) when (i) the determined velocity value becomes less that zero and (ii) the determined velocity value and displacement value have previously exceeded associated predetermined threshold values.

More particularly, with respect to FIG. 4A, once the virtual crash velocity versus virtual crash displacement plot crosses both a first crash velocity threshold ("THRESHOLD_V1") and a first crash displacement threshold ("THRESHOLD_D1"), a first switch quadrant latch or flag is set within the controller 24.

As mentioned, the initial value of K used to determine the velocity/displacement values is set to a first constant (e.g., K=1). The THRESHOLD_V1 and THRESHOLD_D1 define a first switching area within quadrant 1 ("$1^{ST}$ SWITCH_QUADRANT"). The first switch quadrant flag is set when the velocity/displacement plot enters the $1^{ST}$ SWITCH_QUADRANT. The value of K is switched, in accordance with the present invention, once the first switch quadrant flag is set and the velocity/displacement plot crosses a second velocity threshold ("THRESHOLD_V2"). In the example shown in FIG. 4A, THRESHOLD_V2=0.

When the velocity/displacement plot crosses THRESHOLD_V2, the velocity/displacement plot enters a fourth switching quadrant ("$4^{th}$ SWITCH_QUADRANT"). In the example shown, the value of K is switched at this point to K=3. The value of K is again switched (e.g., back to K=1), in accordance with the present invention, when the velocity/displacement plot crosses a second displacement threshold ("THRESHOLD_D2"). At this point, the velocity/displacement plot exits the $4^{th}$ SWITCH_QUADRANT. It should be appreciated that this switching of the K value more quickly returns the velocity and displacement values back to their original values as compared to keeping K=1 for the entire event sequence.

With reference to FIG. 4B, a misuse event is depicted resulting in rearward metric values, i.e., velocity and displacement are negative. Assuming for purposes of illustration, the value of K is initially set to 1 in this misuse event. For this misuse event, the velocity/displacement plot moves through quadrants 3 and 2. A third velocity threshold ("THRESHOLD_V3") and a third displacement threshold ("THRESHOLD_D3") define a third switching quadrant ("$3^{rd}$ SWITCH_QUADRANT"). A third switch quadrant flag is set when the velocity/displacement plot enters the $3^{rd}$ SWITCH_QUADRANT. When the velocity/displacement plot crosses a fourth velocity threshold ("THRESHOLD_V4"), the velocity/displacement plot enters a second switching quadrant ("$2^{nd}$ SWITCH_QUADRANT"). Here, the value of K is switched from the first value (e.g., K=1) to a second value (e.g., K=3). The value of K is again switched back to its initial value (e.g., K=1), in accordance with the present invention, when the plot crosses a fourth displacement threshold ("THRESHOLD_D4"). This returns the velocity/displacement values to the initial values quicker than if K were set equal to 1 during the entire event.

The mass-spring model of the present invention assumes a natural frequency of the occupant between 1–12 Hz. The threshold values shown in FIGS. 4A and 4B are empirically determined to define switching areas or criteria within operating quadrants to achieve the desired modeling characteristics for a particular vehicle platform. It is to be appreciated that other values may be empirically determined for a particular vehicle platform of interest. Moreover, the thresholds need not be fixed or constant values as illustrated in the figures. Additionally, the switching quadrants illustrated in the figures extend indefinitely and are not limited by upper thresholds.

Figure 5:
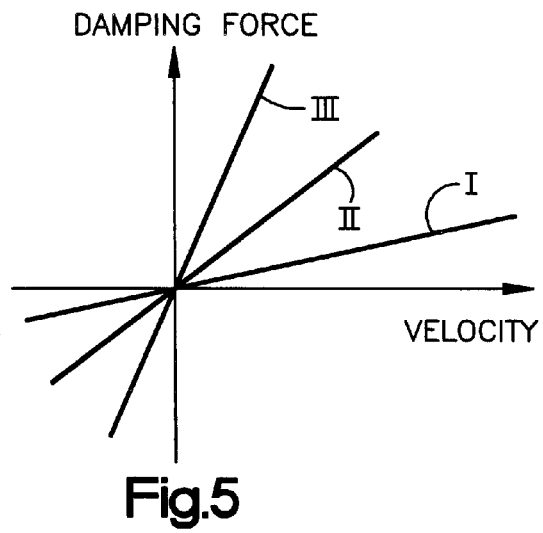
FIG. 5 is a graphical representation of damping force of a belted occupant as a function of occupant velocity.

Referring to FIG. 5, the relationship of damping force as a function of both the velocity and displacement are depicted. Three different values of B are shown dependent upon the determined displacement value. The displacement range is divided into three zones, i.e., I, II, or III. Zone I is when the occupant is at a location X>0, i.e., he is forward from the initial zero position. Zone II is a location between –w and a location less than zero. Zone III is a location less than –w. The value of B is dependent upon the zero location. When the occupant is in zone I (e.g., X>0), $B=B_x$. When the Occupant is in zone II (e.g., $-w \leqq X \leqq 0$), $B=2B_x$. When the occupant is in zone III (e.g., X<-w), $B=3B_x$.

Figure 6:
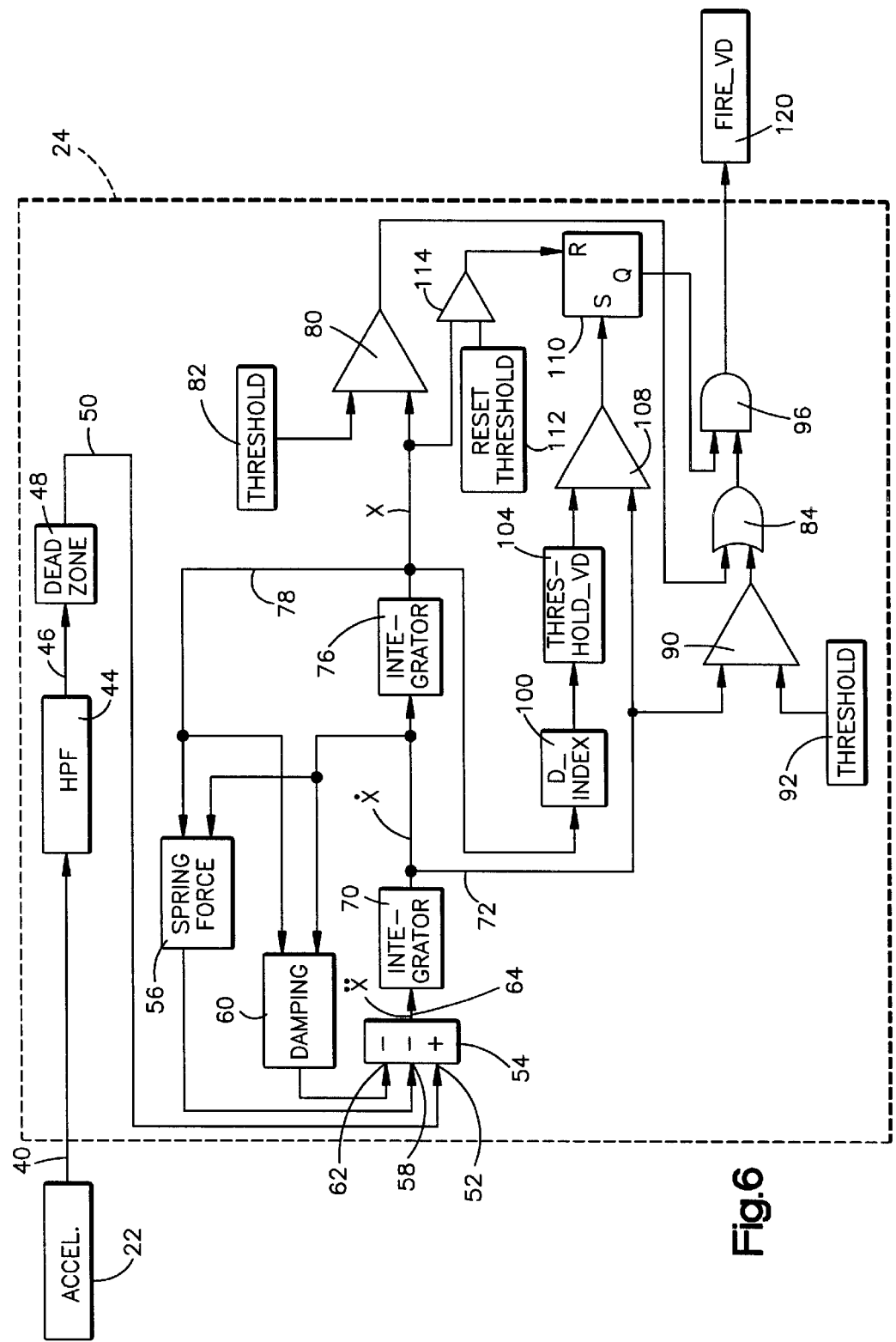
FIG. 6 is a schematic representation in block diagram form of part of the functions performed by a controller of the restraint system shown in FIG. 1.

FIG. 6 is a functional block diagram schematically representing the control processes performed by the controller 24. The elements shown in the controller block 24 correspond with operations performed internally by the controller 24. The controller 24, in accordance with one exemplary embodiment is a microcomputer programmed to perform these functions. Those skilled in the art will appreciate that the functions could be performed with discrete circuitry and that the combination of such discrete circuitry would then form the controller 24.

As shown in the example illustrated in FIG. 6, the accelerometer 22 outputs an acceleration signal 40 having a characteristic indicative of the vehicle's deceleration due to a crash event, also referred to in the art as "crash acceleration." The acceleration signal 40 is typically pre-filtered by associate discrete filters forming part of an accelerometer assembly carrying the accelerometer 22. These pre-filters eliminate extraneous frequency components that are not indicative of a vehicle crash event. Additionally, the acceleration signal is usually digitally high-passed-filtered by the controller 24 using a high-pass-filter ("HPF") function 44. The filtered acceleration signal 46 is provided to a dead zone function 48.

The dead zone function 48 subtracts a value of ±1 g (g being the value of acceleration due to the earth's gravity, e.g., 32 ft/sec$^2$ or 9.8 meters/sec$^2$) from the value of the acceleration signal. This dead zone functions as a calibration parameter. One function of the dead zone is to remove the effect of vehicle braking from the acceleration signal. Another function of the dead zone 48 is to re-align certain crash events such as pole crashes. During a pole crash, it is desirable to have the "beginning" of the crash event occur (for discrimination purposes) when the pole "hits" the engine block. Depending on the particular vehicle platform of concern and the desires of the vehicle manufacture, the calibration parameter of the dead zone function 48 could be zero or a value greater than 0 (zero).

The dead zone function 48 outputs a modified acceleration signal 50 to a positive input 52 of a summing circuit 54. A spring force function 56 utilizes the spring mass model in accordance with the present invention to output a spring force value to a negative input 58 of the summing circuit 54. A damping function 60 outputs a damping value to a negative input 62 of the summing circuit 54. The output 64 of the summing circuit 54 is the adjusted acceleration signal that has been adjusted in response to the occupant spring mass model of the present invention and thus more nearly represents true acceleration of the vehicle occupant. The values of the spring force 56 and the viscous damping 60 are set to initial values. The damping value changes as depicted in FIG. 5. The value of the spring force is changed as shown in FIGS. 4A and 4B and in a manner described in further detail below. Since further discrimination is performed on an adjusted acceleration signal that represents the "actual" or "virtual" acceleration of the occupant, the adjusted signal is referred to as a virtual sensor signal.

The adjusted acceleration signal (output 64) is applied to the input of an integrator function 70. The output 72 of the integrator function 70 is the crash velocity metric value of the adjusted crash acceleration value (e.g., it is the virtual occupant velocity determined from the crash acceleration signal). The output 72 is applied to the input of the spring force function 56, the input of the viscous damping function 60 and to the input of second integrator function 76. The output 78 of the integrator function 76 is the crash displacement metric value based on the adjusted crash acceleration value 64 (e.g., it is the virtual occupant displacement determined from the crash acceleration signal). The output 78 of the integrator function 78 is applied to the input of the spring force function 56 and to the input of the viscous damping function 60.

The spring force function 56 determines the spring force value to be input to the summing circuit 54 in accordance with the plots shown in FIGS. 4A and 4B and in a manner set forth in greater detail below. The viscous damping function 60 determines the viscous damping value to be input to the summing circuit 54 by using the values that are graphically depicted in FIG. 5. In a microcomputer, these values can be stored in a look-up table or calculated. In response to both the determined virtual displacement value 78 and the determined virtual velocity value 72, the viscous damping value is output. In an analog implementation, the viscous damping function can be conveniently implemented as a variable gain amplifier having the input taken from the output of integrator 70.

With continued reference to FIG. 6, the value of the virtual displacement 78 is input to one input of a comparator function 80. The other input of the comparator function 80 is connected to a predetermined threshold value 82. If the virtual displacement value 78 is greater than the threshold value 82, the comparator function 80 outputs a digital HIGH. Otherwise, the output of the comparator function 80 is a digital LOW. The output of the comparator function 80 is applied to one input of OR gate 84.

The value of the virtual velocity 72 is applied to one input of a comparator function 90. The other input of the comparator function 90 is connected to a predetermined threshold value 92. If the virtual crash velocity value 72 is greater than the threshold value 92, the comparator function 90 outputs a digital HIGH. Otherwise, the output of the comparator function 90 is a digital LOW. The output of the comparator function 90 is applied to the other input of OR gate 84. The output of the OR gate function 84 is applied to one input of AND gate 96.

Figure 7:
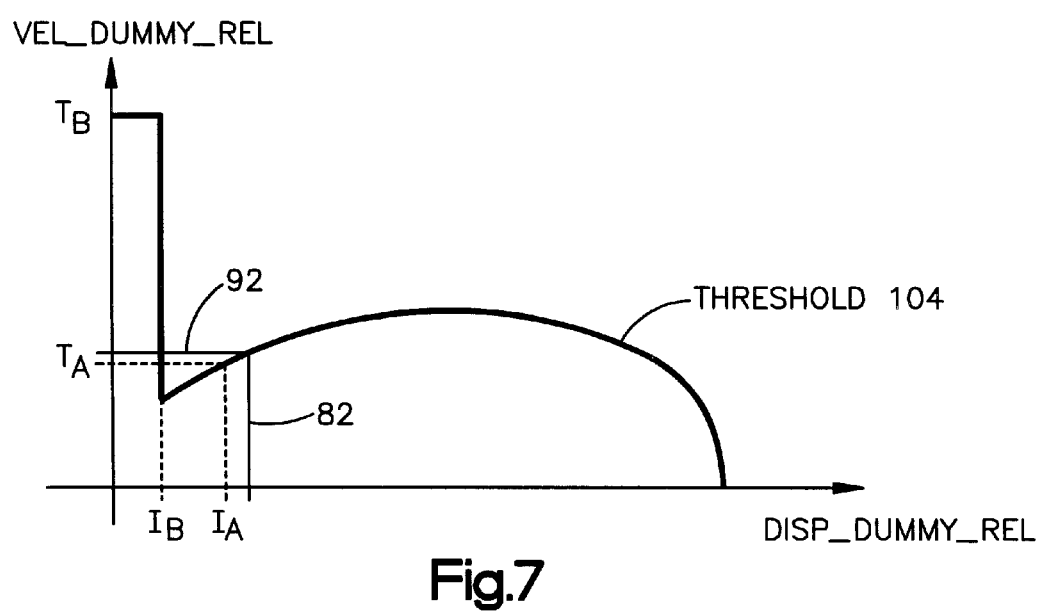
FIG. 7 is a graphical representation of a variable threshold value with the value of the virtual occupant velocity (relative to vehicle coordinates) being on the Y-axis and virtual occupant displacement (relative to vehicle coordinates) being on the X-axis.

The virtual crash displacement value 78 is also output to a displacement indexing function 100 ("D_INDEX"). The indexing function 100 divides the determined virtual displacement value 78 into discrete values that are used to index a look-up table. One of the discrete displacement values is supplied to the displacement threshold determining function 104 ("THRESHOLD_VD"). The output of the threshold determining function 104 is applied to one input of a comparator function 108. The threshold value output from the threshold determining function 104 is graphically depicted in the graph of FIG. 7. For example, an index value of $I_A$ will select a threshold value of $T_A$. The values depicted in the graph are empirically determined to achieve desired restraint actuation when combined with other deployment requirements. Initially (index less than $I_B$), the value of the threshold value is set to a predetermined, high value $(T_B)$ The predetermined, high value $(T_B)$ inhibits premature actuation of the restraint in response to an initial high value of the acceleration (e.g., an initial acceleration spike).

The velocity value 72 is also supplied to the other input of the comparator function 108. The comparator function 108 determines if the virtual crash velocity value 72 is greater than the displacement-dependent variable threshold value 104. If the determination is affirmative, a digital HIGH is output from the comparator function 108. Otherwise, a digital LOW is output from the comparator function 108.

The output of the comparator function 108 is connected to a latch function 110. When a HIGH is output by comparator function 108, the HIGH at the "set" input of latch 110 causes the output ("Q") of latch function 110 to be set HIGH. Latch function 110 continues to output a HIGH until reset. Reset of latch 110 occurs when the virtual displacement value 78 decreases below a reset threshold value 112. To accomplish the reset, the virtual displacement value 78 is connected to one input of a comparator 114. A reset threshold value 112 is provided to the other input of comparator 114. The output of the comparator 114 is connected to a reset input of latch 110. The output Q of latch 110 is connected to the other input of AND gate 96.

The output of the AND gate 96 is a FIRE signal 120 ("FIRE_VD") which is output to the actuator 26 (FIG. 1). Those skilled in the art will appreciate that the active restraint 28 is actuated (i) when the determined velocity value 72 is greater than threshold 92 or the determined displacement value 78 is greater than the threshold 82 and (ii) when the determined velocity value 72 is greater than the displacement dependent threshold value 104. The purpose of the latch 110 is to confirm the existence of an affirmative comparison from comparator 108 (e.g., a HIGH) for a time sufficient for the other needed logic determination.

Figure 8A:
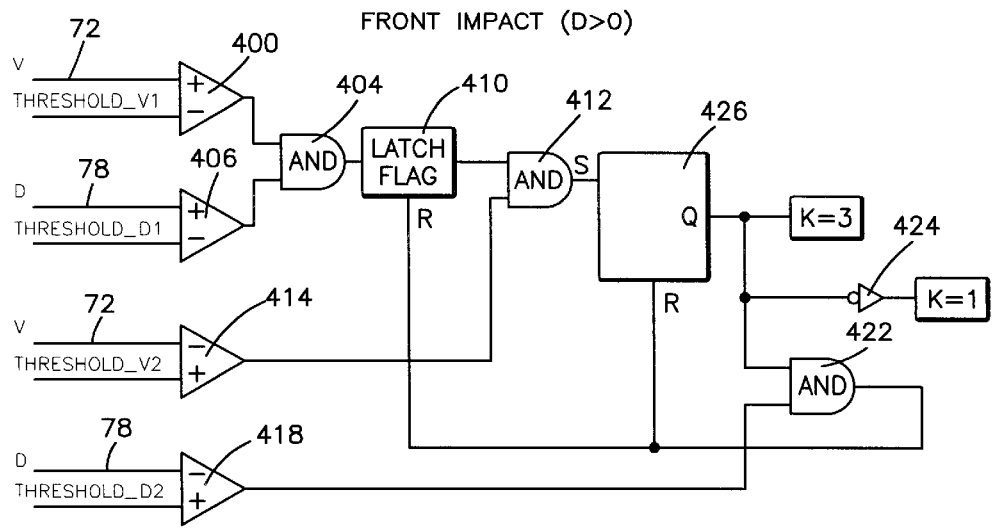
FIG. 8A is a schematic diagram of the functions performed by a controller to determine the spring constant value during a frontal impact crash event in accordance with the enhanced spring mass model of the present inventing
Figure 8B:
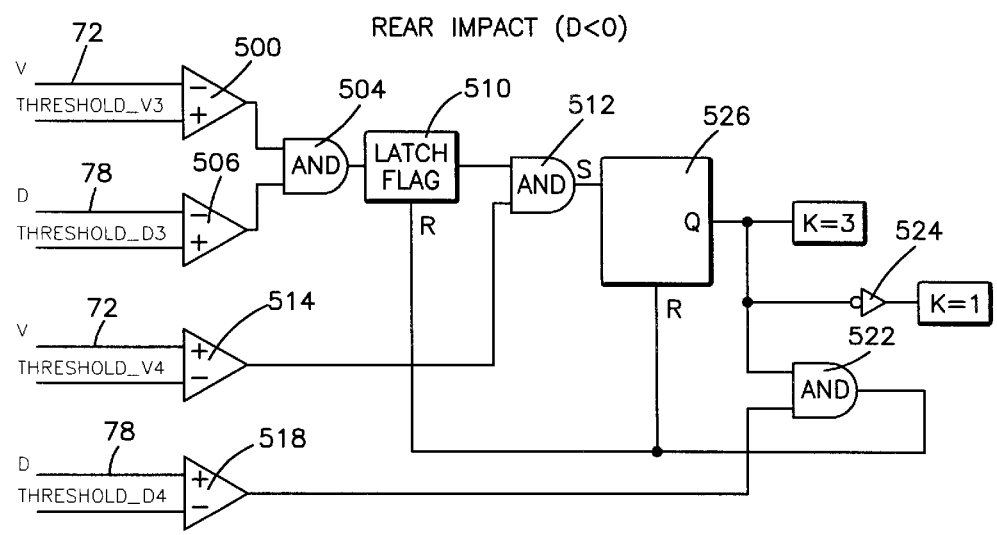
FIG. 8B is a schematic diagram of the functions performed by a controller to determine the spring constant value during a rear impact crash event in accordance with the enhanced spring mass model of the present invention.

FIGS. 8A and 8B are functional block diagrams schematically representing a more detailed illustration of the spring force determination function 56 performed by the controller 24 in accordance with the enhanced spring mass model of the present invention. In particular, FIG. 8A shows the spring force determination when signals from the accelerometer provide frontal impact values while FIG. 8B shows the determination when signals from the accelerometer provide rearward impact values.

With reference to FIG. 8A, the value of the determined virtual velocity 72 is input to one input of comparator function 400. The other input of comparator function 400 is connected to the first predetermined threshold velocity value (THRESHOLD_V1). If the virtual velocity value 72 is greater than THRESHOLD_V1, the comparator function 400 outputs a digital HIGH. Otherwise, the output of the comparator function 400 is a digital LOW. The output of the comparator function 400 is applied to one input of AND gate function 404.

The value of the determined virtual displacement 78 is applied to one input of a comparator function 406. The other input of the comparator function 406 is connected to the first predetermined threshold displacement value (THRESHOLD_D1). If the determined displacement value 78 is greater than THRESHOLD_D1, the comparator function 406 outputs a digital HIGH. Otherwise, the output of the comparator function 406 is a digital LOW. The output of the comparator function 406 is applied to the other input of the AND gate 404.

The output of AND gate 404 is a digital HIGH when both of its inputs receive a digital HIGH. Otherwise, AND gate 404 outputs a digital LOW. The output of AND gate 404 is connected to a latch flag function 410. The latch flag function 410 latches when the output of AND gate 404 feeds a digital HIGH to the input of latch flag function 410. The latch flag function 410 outputs a digital HIGH when it is latched (i.e., flag set), otherwise, the latch flag function 410 outputs a digital LOW (i.e., flag cleared). The latch flag function 410 is originally set to zero or cleared so that it initially outputs a digital LOW. The output of the latch flag function 410 is applied to one input of AND gate 412. The output of the latch flag function 410 being HIGH or set is indicative of the velocity/displacement plot of FIG. 4A entering the shaded area of the $1^{st}$ SWITCH_QUADRANT.

The determined velocity value 72 is connected to the inverting input of comparator function 414. The non-inverting input of comparator function 414 is connected to the second predetermined threshold velocity value (THRESHOLD_V2). In the example illustrated in FIGS. 4A, 4B, 8A and 8B, THRESHOLD_V2=0. However, THRESHOLD_V2 need not be zero. Moreover, all values illustrated herein, including the threshold values and the values of spring constant K can be any value or even a functionally related value, depending on the desired performance characteristics of the system and the vehicle platform of interest.

The output of comparator function 414 is a digital HIGH when THRESHOLD_V2 is greater than the determined velocity value 72. Otherwise, the output of the comparator function 414 is a digital LOW. The output of comparator function 414 is connected to the other input of AND gate 412. The output of AND gate 412 is a digital HIGH when both of its inputs receive a digital HIGH. This occurs when the velocity/displacement plot of FIG. 4A passes through the shaded area of the $1^{st}$ SWITCH_QUADRANT and then crosses the THRESHOLD_V2 thereby entering the shaded area of the $4^{th}$ SWITCH_QUADRANT. Otherwise, the output of AND gate 412 is a digital LOW.

The determined displacement value 78 is input to the inverting input of comparator function 418. The non-inverting input of comparator function 418 is connected to the second predetermined displacement threshold (THRESHOLD_D2). When the virtual displacement value 78 becomes less than THRESHOLD_D2, the output of comparator function 418 switches HIGH. Otherwise, the output of the comparator function 418 is a digital LOW. The output of comparator function 418 is connected to one input of an AND gate 422. The output of AND gate 422 is connected to the HIGH true reset input ("R") of latching function 426 and the latch flag function 410 to clear the flag when AND gate 422 outputs a HIGH.

The output of AND gate 412 is connected to the set input ("S") of latching function 426. When a digital HIGH is output from AND gate 412, latching function 426 is set. When latching function 426 is set, the output ("Q") of latching function 426 is a digital HIGH. The output Q of latching function 426 continues to be a digital HIGH until latching function 426 is reset. Latching function 426 is reset to zero and outputs a digital LOW when the reset input R of latching function 426 receives a digital HIGH. The reset input of latching function 426 receives a digital HIGH when AND gate 422 outputs a digital HIGH. The latching function 426 is initially reset and therefore, initially outputs a digital LOW until it is set by AND gate 412. Latching function 426 once again outputs a digital LOW after it is reset by AND gate 422. When AND gate 422 outputs a HIGH, it clears the flag in 410 so that the flag output is LOW.

The output of latching function 426 is connected to an INVERTER gate 424. The output of 426 controls the value of K. When the output of 426 is HIGH, K=3. When the output of 426 is LOW, K=1.

Accordingly, because the latching function 426 is initially set to zero and therefore, initially outputs a digital LOW, the value of the spring constant is not switched from K=1 to K=3 until the latching function 426 outputs a digital HIGH. Additionally, because the latching function 426 remains latched and does not output a digital LOW until it is reset, the value of K is not switched back to 1 until the latching function 426 is reset. In the example illustrated, the value of spring constant K is 3 while the velocity/displacement plot values are in the shaded area of the $4^{th}$ SWITCH_QUADRANT.

With reference to FIG. 8B, the value of the determined virtual velocity 72 is input to the inverting input of comparator function 500. The non-inverting input of comparator function 500 is connected to the third predetermined threshold velocity value (THRESHOLD_V3). If THREHOLD_V3 is greater than the virtual velocity value 72, the comparator function 500 outputs a digital HIGH. Otherwise, the output of the comparator function 500 is a digital LOW. The output of the comparator function 500 is applied to one input of AND gate function 504.

The value of the determined virtual displacement 78 is applied to the inverting input of a comparator function 506. The non-inverting input of the comparator function 506 is connected to the third predetermined threshold displacement value (THRESHOLD_D3). If THRESHOLD_D3 is greater than the determined displacement value 78, the comparator function 506 outputs a digital HIGH. Otherwise, the output of the comparator function 506 is a digital LOW. The output of the comparator function 506 is applied to the other input of the AND gate 504.

The output of AND gate 504 is a digital HIGH when both of its inputs receive a digital HIGH. This occurs when the velocity/displacement plots enter the shaded area of the $3^{rd}$ SWITCH_QUADRANT. Otherwise, AND gate 504 outputs a digital LOW. The output of AND gate 504 is connected to a latch flag function 510. The latch flag function 510 latches when the output of AND gate 504 feeds a digital HIGH to the input of the latch flag function 510. The latch flag function 510 outputs a digital HIGH (i.e., flag set) when it is latched, otherwise, the latch flag function 510 outputs a digital LOW (i.e., flag cleared). The latch flag function 510 is originally set to zero or cleared so that it initially outputs a digital LOW. The output of the latch flag function 510 is applied to one input of AND gate 512.

The determined velocity value 72 is connected to the non-inverting input of comparator function 514. The inverting input of comparator function 514 is connected to the fourth predetermined threshold velocity value (THRESHOLD_V4). In the example illustrated in FIGS. 4A, 4B, 8A and 8B, the fourth predetermined threshold velocity value is zero. However, THRESHOLD_V4 need not be zero. Moreover, as stated above, all values illustrated herein, including the threshold values and the values of spring constant K can be any value or even a functionally related value, depending on the desired performance characteristics of the system for the vehicle platform of interest.

The output of comparator function 514 is a digital HIGH when the determined velocity value 72 is greater than THRESHOLD_V4. Otherwise, the output of the comparator function 514 is a digital LOW. The output of comparator function 514 is connected to the other input of AND gate 512. The output of AND gate 512 is a digital HIGH when both of its inputs receive a digital HIGH. This indicates the velocity/displacement plot has passed through the shaded area of the 3$^{rd}$ SWITCH_QUADRANT and has crossed over the THRESHOLD_V4 thereby entering the shaded area of the 2$^{nd}$ SWITCH_QUADRANT. Otherwise, the output of AND gate 512 is a digital LOW.

The determined displacement value 78 is input to the non-inverting input of comparator function 518. The inverting input of comparator function 518 is connected to the fourth predetermined displacement threshold (THRESHOLD_D4). If THRESHOLD_D4 is greater than the virtual displacement value 78, the output of comparator function 518 is a digital HIGH. Otherwise, the output of the comparator function 518 is a digital LOW. The output of comparator function 518 is connected to one input of AND gate 522. The output of AND gate 522 is connected to the HIGH true reset input ("R") of latching function 526 and the latch flag function 510 to clear the flag when AND gate 522 outputs a HIGH.

The output of AND gate 512 is connected to the set input ("S") of latching function 526. When a digital HIGH is output from AND gate 512 latching function 526 is set. When latching function 526 is set, the output ("Q") of latching function 526 is a digital HIGH. The output Q of latching function 526 continues to be a digital HIGH until latching function 526 is reset. Latching function 526 is reset to zero and outputs a digital LOW when the reset input R of latching function 526 receives a digital HIGH. The reset input of latching function 526 receives a digital HIGH when AND gate 522 outputs a digital HIGH. The latching function 526 is initially set to zero and therefore, initially outputs a digital LOW until it is set by AND gate 512. Latching function 526 once again outputs a digital LOW after it is reset by AND gate 522. When the AND gate 522 outputs a HIGH, it also clears the flag in 510 so that the output is LOW.

The output of latching function 526 is connected to an INVERTER gate 524. The output of 526 controls the value of K in misuse events producing rearward impact values. When 526 is set, K=3. When 526 is reset, K=1.

Accordingly, because the latching function 526 is initially set to zero and therefore, initially outputs a digital LOW, the value of spring constant is not switched to 3 until the latching function 526 outputs a digital HIGH. Additionally, because the latching function 526 remains latched and does not output a digital LOW until it is reset, the value of K is not switched back to 1 until the latching function 526 is reset.

Figure 9B:
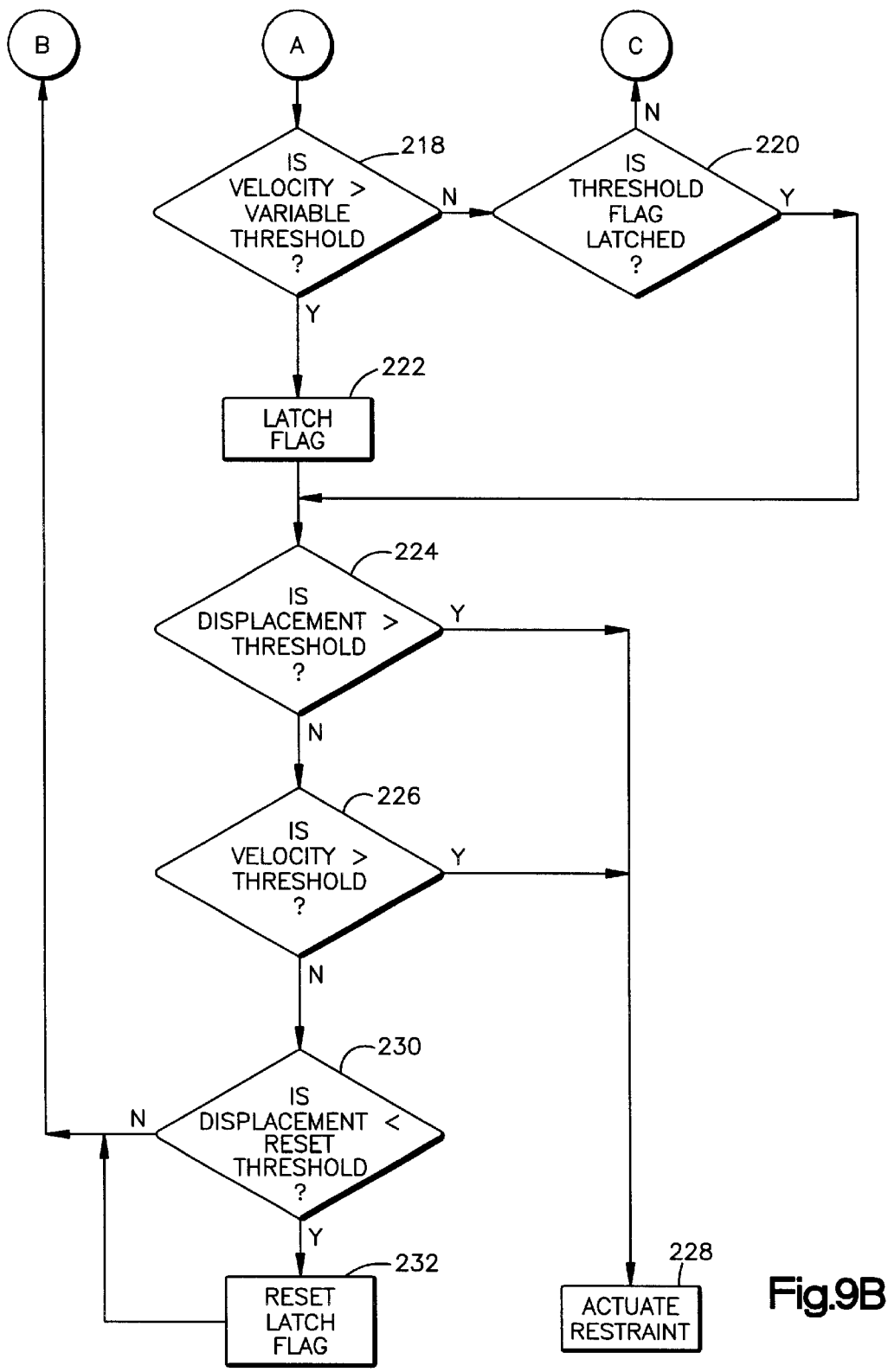

A control process 200, for the restraint system is represented in FIGS. 9A and 9B. The process starts with step 202 in which memories are cleared, flags are set to initial conditions, etc. In step 204, the present value of the acceleration signal is retrieved from an internal A/D converter. The A/D converter converts the value of the acceleration signal 40 into a digital value. Also, in step 204, the acceleration signal is digitally filtered.

The process then proceeds to step 206 where the dead zone realignment function is performed as described above. In step 208, the realigned and filtered acceleration value is summed with spring force determined in accordance with the present invention and the viscous damping values stored in memory. As stated previously, the initial viscous damping value is zero. This yields an adjusted or "virtual" acceleration value. In step 210, the virtual velocity value is determined by software integration of the virtual acceleration value. In step 212, the virtual crash displacement metric value is determined by software integration of the virtual velocity.

The process then proceeds to step 214 in which the spring-force value is determined as described above with reference to FIGS. 4A and 4B. The control process is described below. In step 216, the viscous damping value is calculated in accordance with the FIG. 5 transfer function. The values calculated in step 216 are stored in memory for later use in the next pass through step 208. The initial pass through step 208 uses zero for the damping value. All subsequent passes through step 208 use the calculated value. The value of the spring-force will be switched as described. This "feedback" process is represented by the dotted line running from steps 214 and 216 back to step 208.

The process proceeds to step 218. In step 218, the variable threshold value 104 is determined. As part of this step, the value of the virtual occupant displacement determined in step 212 is used to index (address) a look-up table in which the FIG. 7 pattern of threshold values is stored. Further in step 218, a determination is made as to whether the virtual crash velocity value determined in step 210 is greater than the variable threshold value 104.

If the determination in step 218 is negative, the process proceeds to step 220. In step 220, a determination is made as to whether the velocity; threshold flag has been latched. The velocity threshold flag is originally set to a digital LOW or unlatched condition. If the determination in step 220 is negative, the process returns to step 204. Otherwise, process flow proceeds to step 224. Thus, steps 224 through 232 may only be performed if the virtual velocity is above the threshold value 104 or has been above the threshold previously during this crash event.

When the determination in step 218 is affirmative, the latch 110 is set in step 222, e.g., the output Q of latching function 110 outputs a digital HIGH. From step 222 or from an affirmative determination in step 220, the process proceeds to step 224. In step 224, a determination is made as to whether the virtual crash displacement value determined in step 212 is greater than the threshold value 82. If the determination in step 224 is negative, the process proceeds to step 226.

In step 226, a determination is made as to whether the virtual crash velocity value determined in step 210 is greater than the threshold value 92. If the determination in step 224 or step 226 is affirmative, the process actuates the restraint in step 228. If the determination in step 226 is negative, the process proceeds to step 230 where it is determined if the displacement value determined in step 212 is now less than the reset threshold value 112. The reset threshold value 112 is less than threshold value 82. If the determination in step 230 is affirmative, the process proceeds to step 232 where the flag of latch 110 is reset. From either a negative determination in step 230 or from step 232, the process returns to step 204.

Figure 10:
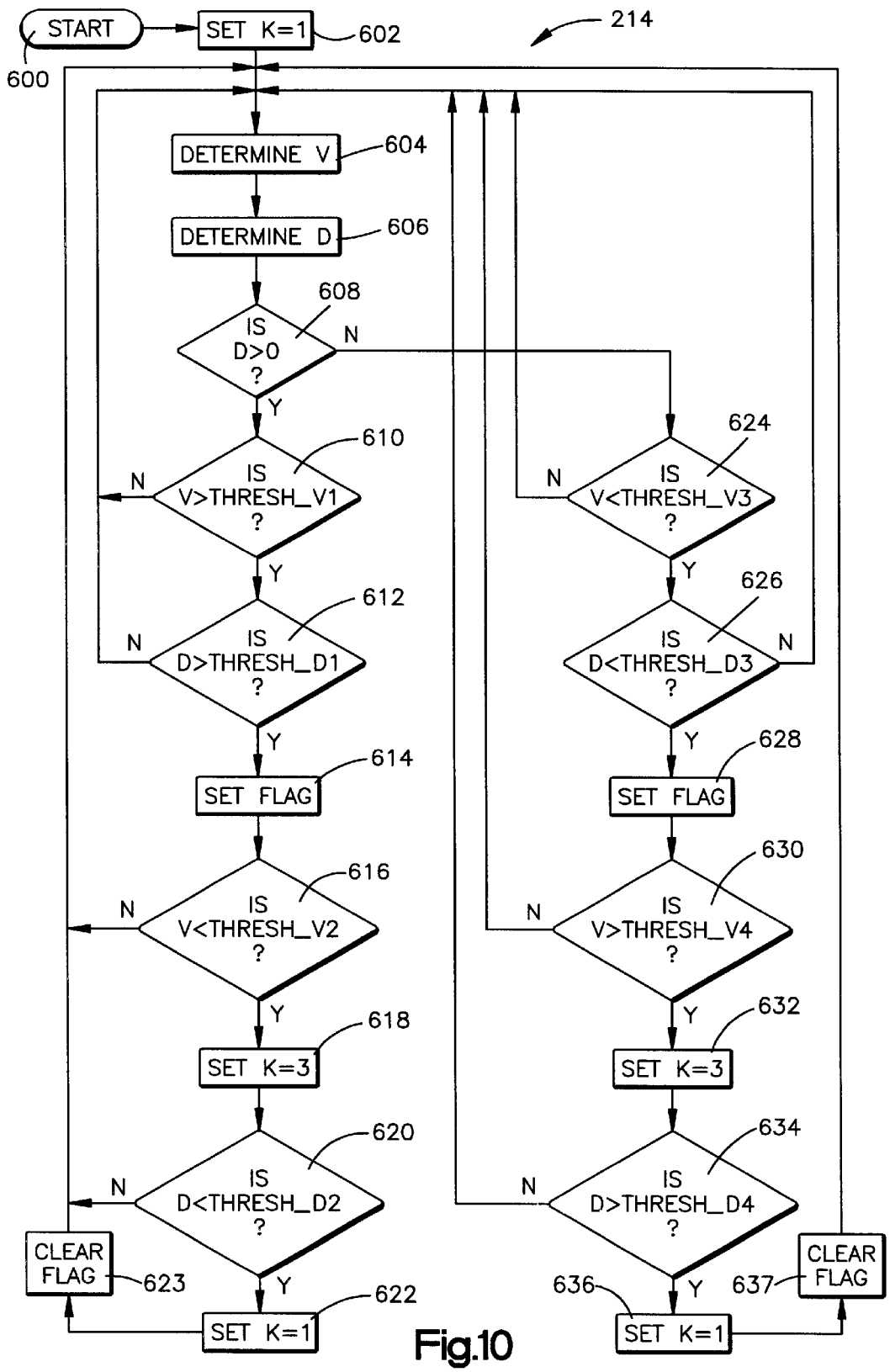
FIG. 10 depicts, in flow chart form, a control process for determining the enhanced spring constant value in accordance with the enhanced spring mass model of the present invention.

With reference now to FIG. 10, step 214 which is disclosed in FIG. 9A and labeled as "Determine Spring Force Value", is discussed in further detail. The process starts at step 600 in which memories are cleared, flags are set to initial conditions, etc. The process then proceeds to step 602 where, in the example illustrated, the value of K is set to an initial value, e.g., K=1.

The process then proceeds to steps 604 and 606 where the values of the virtual velocity 72 and virtual displacement 78 are determined, respectively. These may simply be recalled from memory as they were previously stored in memory after being determined in steps 210 and 212, respectively (FIG. 9A).

The process then proceeds to step 608 where a determination is made as to whether the determined displacement is greater than zero. If the displacement is greater than zero, this is indicative of an event yielding frontal metric values (FIG. 4A). If the determined displacement value 78 is not greater than zero, this is indicative of an event yielding rearward metric values (FIG. 4B).

If the determined displacement metric is greater than zero, the proceeds to step 610 where a determination is made as to whether virtual velocity value 72 is greater than THRESHOLD_V1. If the virtual velocity is not greater than THRESHOLD_V1, the process returns to steps 604 and 606 and again obtains the virtual velocity 72 and virtual displacement 78 values, respectively.

If the determination in step 610 is in the affirmative, meaning that the virtual velocity is greater than THRESHOLD_V1, the process proceeds to step 612 wherein a determination is made as to whether the determined displacement value is greater than THRESHOLD_D1. If the determined displacement value 78 is not greater than THRESHOLD_D1, the process returns to steps 604 and 606 wherein the values of the virtual velocity 72 and virtual displacement 78 are, respectively, once again obtained.

If the determination in step 612 is in the affirmative, meaning that the determined displacement is greater than THRESHOLD_V1, the process proceeds to step 614 wherein a flag is latched or set. The process then proceeds to step 616 where the virtual velocity value 72 is compared to the THRESHOLD_V2. If the determination in step 616 is negative because THRESHOLD_V2 is not greater than the virtual velocity value, the process returns to steps 604 and 606 and again, the values of the determined velocity and the determined displacement are respectively obtained.

If the determination in step 616 is affirmative because virtual velocity is less than THRESHOLD_V2, the process proceeds to step 618 wherein, in the illustrated example, the value of spring constant K is set to a second value, e.g., K=3.

The process then proceeds step 620 wherein the determined displacement value is compared to THRESHOLD_D2. If the determination in step 620 is negative because the THRESHOLD_D2 is not greater than the determined displacement value, the process returns to steps 604 and 606 and the determined velocity 72 and determined displacement 78 values are again obtained. However, if the determination in step 620 is affirmative because THRESHOLD_D2 is less than the second threshold displacement value, the process proceeds to step 622 wherein the value of K is set to a value, e.g., K=1. The process then proceeds to step 623 where the flag set in 614 is cleared. The process then returns to steps 604 and 606 and the values of virtual velocity 72 and virtual displacement 78 are obtained again and the process is repeated.

If the determination in step 608 is negative because the displacement value is less than zero (e.g. an event resulting in rearward metric values), the process proceeds to step 624 wherein the virtual velocity is compared to THRESHOLD_V3. If THRESHOLD_V3 is not greater than the virtual velocity, the process returns to steps 604 and 606 and again obtains the virtual velocity 72 and virtual displacement 78 values, respectively.

If the determination in step 624 is in the affirmative meaning that THRESHOLD_V3 is greater than the virtual velocity, the process proceeds to step 626 wherein a determination is made as to whether THRESHOLD_D3 is greater than the determined displacement value. If THRESHOLD_D3 is not greater than the determined displacement 78, the process returns to steps 604 and 606 wherein the values of the virtual velocity 72 and virtual displacement 78 are, respectively, once again obtained.

If the determination in step 626 is in the affirmative, meaning that THRESHOLD_D3 is greater than the determined displacement value, the process proceeds to step 628 wherein a flag is latched. The process then proceeds to step 630 where the virtual velocity value 72 is compared to THRESHOLD_V4. If the determination in step 630 is negative because the virtual velocity is not greater than THRESHOLD_V4, the process returns to steps and 606 and again, the values of the determined velocity and the determined displacement are respectively obtained.

If the determination in step 630 is affirmative because virtual velocity is less than THRESHOLD_V4, the process proceeds to step 632 wherein, in the illustrated example, the value of spring constant K is set to a value, e.g., K=3.

The process then proceeds step 634 wherein the determined displacement value is compared to THRESHOLD_D4. If the determination in step 634 is negative because THRESHOLD_D4 is not greater than the fourth threshold displacement value, the process returns to steps 604 and 606 and the determined velocity 72 and determined displacement 78 values are again obtained. However, if the determination in step 634 is affirmative because the determined displacement value 78 is greater than THRESHOLD_D4, the process proceeds to step 636 wherein the value of K is set to a value, e.g., K=1. The process then proceeds to step 637 where the flag set in step 628 is cleared. The process then returns to steps 604 and 606 and the values of virtual velocity 72 and virtual displacement 78 are obtained again and the process is repeated.

It is to be appreciated that the foregoing determinations are ongoing and continuous. Accordingly, the determined values disclosed herein are adjusted and/or updated continuously in the background of the present invention.

Figure 11:
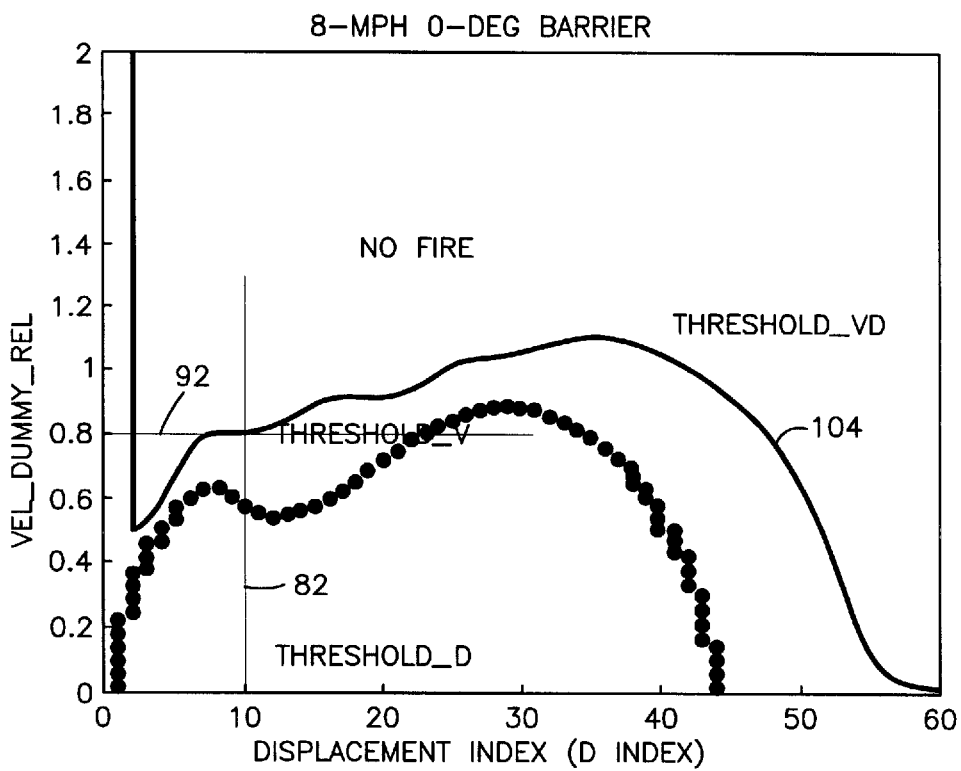
FIGS. 11–18 are graphical representations of determined virtual occupant velocity versus determined virtual occupant displacement during various types of crash events.

FIG. 11 shows an 8 MPH 0° barrier crash event which is a NO FIRE crash event, e.g., one in which the air bag is not to be deployed. The velocity values 72 versus indexed displacement values 100 for the crash event determined by the controller 24 are shown by dots in the graph for a particular vehicle platform. The three threshold values 82, 92, 104 are shown. Although both the fixed threshold values 82 and 92 are exceeded during the crash event, the variable threshold value 104 is never exceeded. Since the ANDing function 96 can not be satisfied, no deployment of the air bag occurs.

Figure 12:
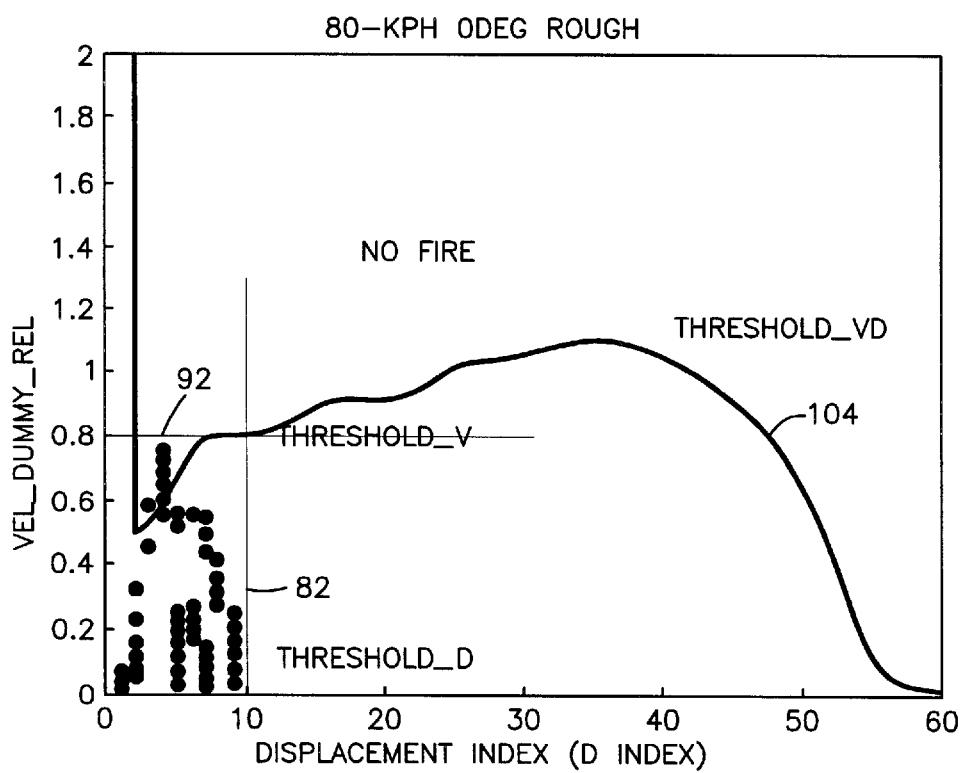

FIG. 12 shows an 80-MPH rough road travel condition of the vehicle. Such a travel condition will produce outputs from the accelerometer which, in fact "sees" a plurality of acceleration events. These are misuse events. This travel condition is, of course, a NO FIRE event, e.g., one in which the air bag is not to be deployed. The velocity values 72 versus indexed displacement values 100 for the event determined by the controller 24 are shown by dots in the graph for a particular vehicle platform. The three threshold values 82, 92, 104 are also shown. Although the variable threshold value 104 is exceeded during the travel event, neither of the fixed threshold values 82 and 92 are ever exceeded. Since the ANDing function 96 can not be satisfied, no deployment of the air bag occurs.

Figure 13:
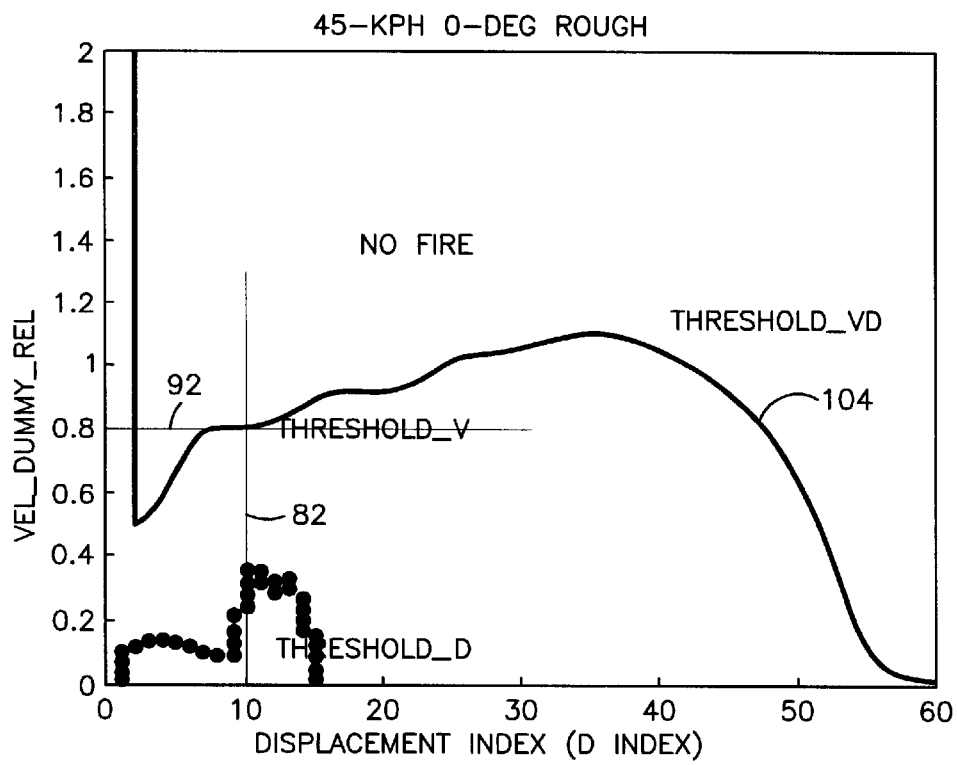

FIG. 13 shows a 40-MPH rough road travel condition of the vehicle. Such a travel condition will produce outputs from the accelerometer which, in fact "sees" a plurality of acceleration events. These are also misuse events. This travel condition is, of course, a NO FIRE event, e.g., one in which the air bag is not to be deployed. The velocity values 72 versus indexed displacement values 100 for the event determined by the controller 24 are shown by dots in the graph for a particular vehicle platform. The three threshold values 82, 92, 104 are also shown. Although the fixed threshold value 82 is exceeded during the travel event, the threshold value 104 is never exceeded. Since the ANDing function 96 can not be satisfied, no deployment of the air bag occurs.

Figure 14:
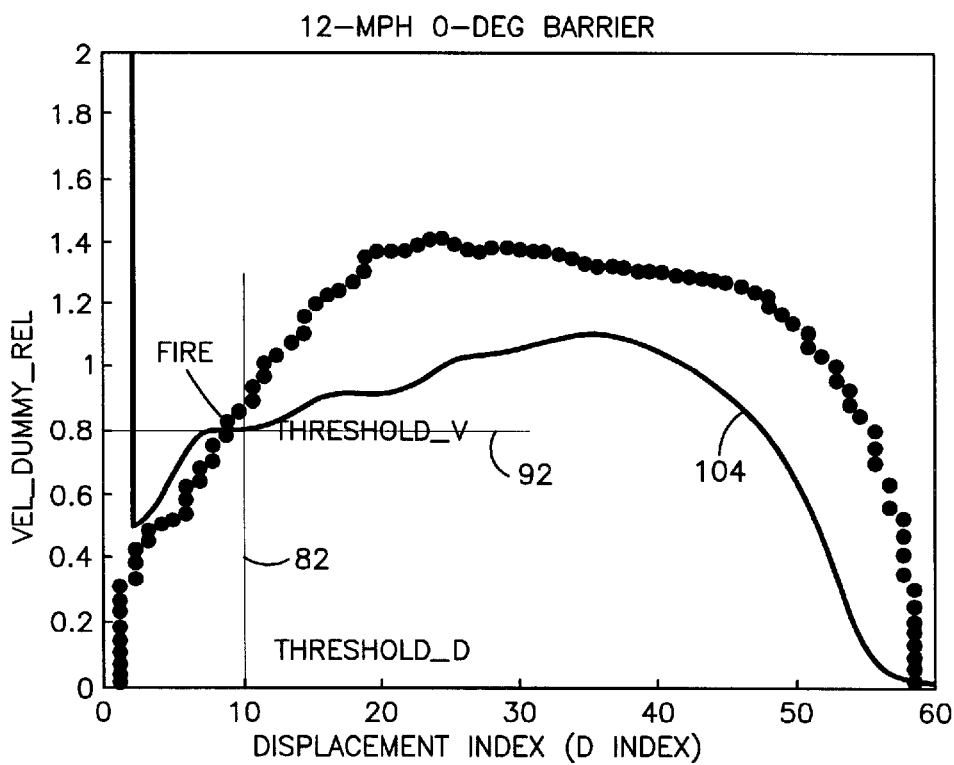

FIG. 14 shows a 12 MPH 0° barrier crash event of the vehicle. This crash event is a FIRE crash event, e.g., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed when the threshold values 92 AND 104 are exceeded.

Figure 15:
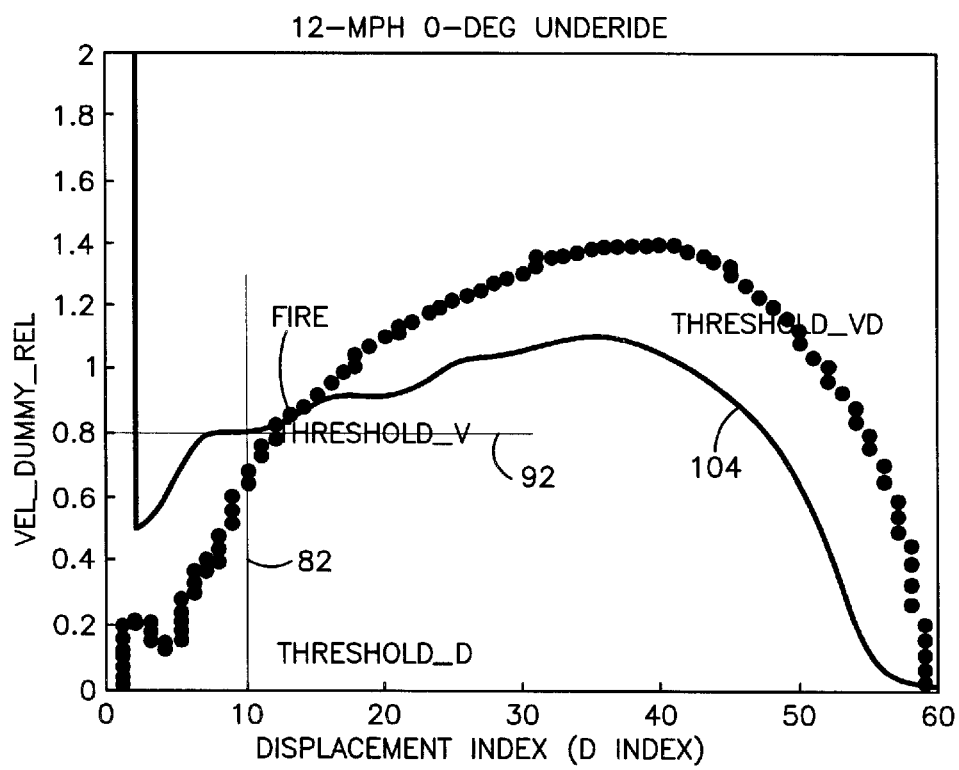

FIG. 15 shows a 12 MPH 0° underride crash event of the vehicle. This crash event is a FIRE crash event, e.g., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed when the threshold values (82 OR 92) AND 104 are exceeded.

Figure 16:
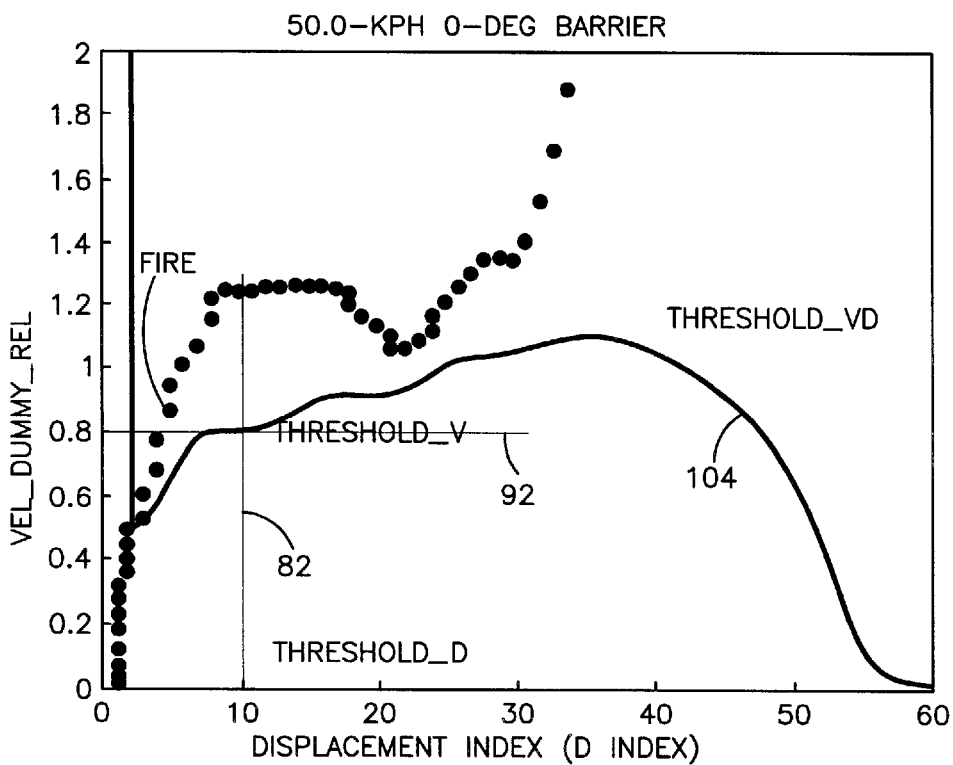

FIG. 16 shows a 50 KPH 0° barrier crash event of the vehicle. This crash event is a FIRE crash event, e.g., one in which the air bag is to be deployed. The velocity values 72 versus indexed displacement values 100 for the crash event determined by the controller 24 are shown by dots in the graph foria particular vehicle platform. The three threshold values 82, 92, 104 are also shown. The air bag is deployed when the threshold values 92 AND 104 are exceeded.

Figure 17:
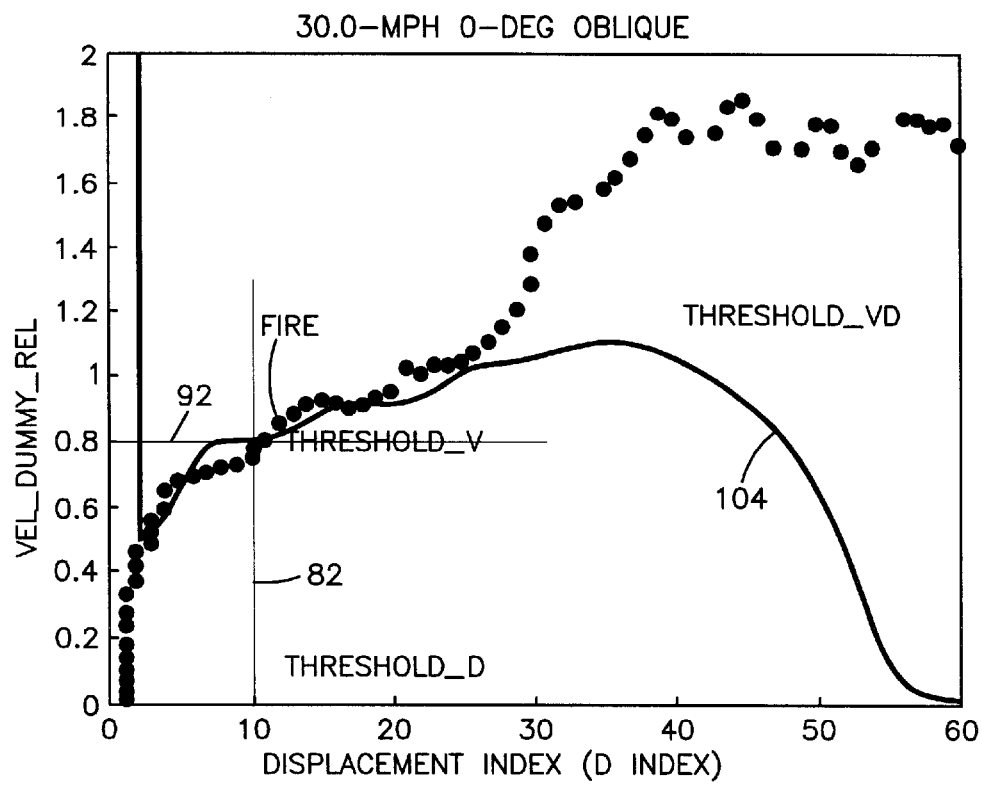

FIG. 17 shows a 12 MPH 0° oblique crash event of the vehicle. This crash event is a FIRE crash event, e.g., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed when the threshold values (82 OR 92) AND 104 are exceeded.

Figure 18:
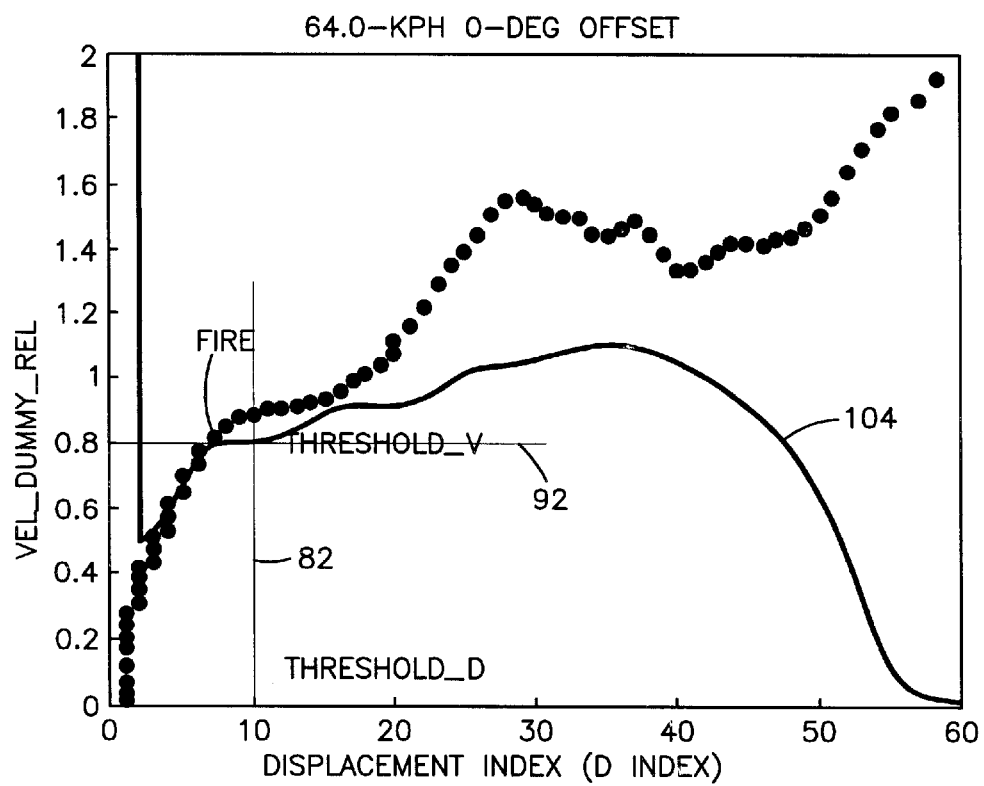

FIG. 18 shows a 64 KPH 0° offset crash event of the vehicle. This crash event is a FIRE crash event, e.g., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed when the threshold values 92 AND 104 are exceeded.

From the above description of the invention, those skilled in the art will perceive improvements, changes, and modifications. Any such improvements, changes, and modifications within the skill of the art are intended to be covered by the appended claims.

Having described the invention, the following is claimed:

1. A spring mass model for use in an actuatable occupant restraint system, said model comprising:

a switchable spring constant having a value responsive to a determined virtual crash velocity value.

2. The model of claim 1 wherein said switchable spring constant value is further responsive to a determined virtual crash displacement value.

3. An actuatable occupant restraint system comprising:

a crash sensor mountable to a vehicle and providing a crash signal in response to a vehicle crash event;

crash velocity determining means for determining a crash velocity value from said crash signal; and, crash determining means for determining the occurrence of a vehicle crash event in response to said determined crash velocity value, said crash determining means including a spring mass model for use in said crash determination, said spring mass model including a switchable spring constant switchable to a value responsive to said determined crash velocity value.

4. The apparatus of claim 3 further comprising:

crash displacement determining means responsive to said crash signal for determining a crash displacement value, said switchable spring constant being further responsive to said determined crash displacement value.

5. The apparatus of claim 4 further comprising:

crash velocity comparing means for comparing said determined crash velocity value to a first predetermined crash velocity value;

crash displacement comparing means for comparing said determined crash displacement value to a first predetermined crash displacement value; and wherein said spring mass model switches said spring constant value based upon the comparisons made by said crash velocity comparing means and said crash displacement comparing means.

6. The apparatus of claim 5 further comprising:

flag means having a set condition only after 1) said determined crash velocity value crosses said first predetermined crash velocity value and 2) said determined crash displacement value crosses said first predetermined crash displacement value.

7. The apparatus of claim 6 wherein said spring mass model switches said spring constant value to a second value when said flag means is set and said determined crash velocity value crosses a second predetermined crash velocity value.

8. The apparatus of claim 7 wherein said spring mass model switches said spring constant value to a third value when said determined crash displacement value crosses a second predetermined crash displacement value.

9. The apparatus of claim 4 wherein said spring mass model switches said spring constant value when (1) said determined crash velocity value crosses a first predetermined crash velocity value and said determined crash displacement value crosses a first predetermined crash displacement value and 2) said determined crash velocity value crosses a second predetermined crash velocity value.

10. The apparatus of claim 9 wherein said spring mass model switches said spring constant value when said determined crash displacement value crosses a second predetermined crash displacement value.

11. An actuatable restraint system comprising:

accelerometer mounted to a vehicle for providing an electric signal indicative of crash acceleration;

spring mass model coupled to said crash acceleration signal for providing a modified crash acceleration signal indicative of the virtual acceleration of a vehicle occupant;

crash velocity determining means for determining a virtual crash velocity value from said virtual crash acceleration signal;

crash displacement determining means for determining virtual crash displacement value from said virtual crash acceleration signal;

crash determining means for monitoring said virtual crash velocity value and said virtual crash displacement value and determining the occurrence of a crash event in response thereto;

first quadrant switch boundary defined by a predetermined crash velocity value and a predetermined crash displacement value;

first determining means for determining when the value of said virtual crash velocity value and said virtual crash displacement value is within said first quadrant switch boundary;

second quadrant switch boundary defined by a predetermined crash velocity value and a predetermined crash displacement value;

second determining means for determining when the value of said virtual crash velocity value and said virtual crash displacement value is within said second quadrant switch boundary; and, means for controlling said spring value in response to said value of said virtual crash velocity value and said virtual crash displacement value being within said first and second quadrant switch boundaries.

12. A method for using a spring mass model in an actuatable occupant restraint system, said method comprising the steps of:

switching a spring constant value in response to a determined occupant crash velocity value.

13. The method of claim 12 wherein said step of switching spring constant value is further responsive to a determined occupant crash displacement value.

14. A method for controlling an actuatable occupant restraint system comprising the steps of:

mounting a crash sensor to a vehicle and providing a crash signal in response to a vehicle crash event;

determining a crash velocity value from said crash signal; and, determining the occurrence of a vehicle crash event in response to said determined crash velocity value, said step of determining including using a spring mass model and selecting a spring constant value responsive to said determined crash velocity value.

15. The method of claim 14 further comprising the steps of determining a crash displacement value, and wherein said step of selecting a spring constant value is further responsive to said determined crash displacement value.

16. The method of claim 15 further comprising the steps of comparing said determined crash velocity value to a first predetermined crash velocity value, comparing said determined crash displacement value to a first predetermined crash displacement value; and switching said spring constant value based upon the comparisons.

17. The method of claim 16 further comprising the steps of setting a flag when 1) said determined crash velocity value crosses said first predetermined crash velocity value and 2) said determined crash displacement value is crosses said first predetermined crash displacement value.

18. The method of claim 17 further comprising the step of switching said spring constant value to a second value when said flag means is set and said determined crash velocity value crosses a second predetermined crash velocity value.

19. The method of claim 18 further comprising the step of switching said spring constant value to a third value when said determined crash displacement value crosses a second predetermined crash displacement value.

20. A method for controlling an actuatable restraint system comprising the steps of:

mounting an accelerometer to the vehicle for providing an electric signal indicative of crash acceleration;

determining a spring mass model of said restraint system for providing a modified crash acceleration signal indicative of the virtual acceleration of a vehicle occupant;

determining a virtual crash velocity value from said virtual crash acceleration signal;

determining a virtual crash displacement value from said virtual crash acceleration signal;

determining the occurrence of a crash event in response to the determined virtual crash velocity value and said determined virtual crash displacement value;

determining when the value of said virtual crash velocity value and said virtual crash displacement value is within a first quadrant switch boundary defined by a predetermined crash velocity value and a predetermined crash displacement value;

determining when the value of said virtual crash velocity value and said virtual crash displacement value is within a second quadrant switch boundary defined by a predetermined crash velocity value and a predetermined crash displacement value; and, controlling said spring value in response to said value of said virtual crash velocity value and said virtual crash displacement value being within said first and second quadrant switch boundaries.

* * * * *